United States Patent [19]

LeBreton et al.

[11] Patent Number: 4,595,037
[45] Date of Patent: Jun. 17, 1986

[54] SPLIT TANK CLOSURE AND DIAPHRAGM ASSEMBLY

[75] Inventors: Edward T. LeBreton, Mentor; Arthur M. Kepler, Atwater; Clyde W. Groves, Madison, all of Ohio

[73] Assignee: Essef Industries, Inc., Mentor, Ohio

[21] Appl. No.: 681,841

[22] Filed: Dec. 14, 1984

[51] Int. Cl.[4] ............................................. F16L 55/04
[52] U.S. Cl. ...................................... 138/30; 220/4 B
[58] Field of Search ..................... 92/98 R, 98 D, 102; 138/30; 220/85 B, 4 B, 4 E; 417/540

[56] References Cited

U.S. PATENT DOCUMENTS

| 2,394,401 | 2/1946 | Overbeke | 220/4 B |
| 3,034,465 | 7/1962 | Horner | 220/85 B |
| 3,066,699 | 12/1962 | Peet | 138/30 |
| 3,148,706 | 9/1964 | Mercier | 138/30 |
| 4,010,773 | 3/1977 | Bihlmaier | 138/30 |
| 4,192,350 | 3/1980 | Mercier | 138/30 |
| 4,216,881 | 8/1980 | Rosman | 220/85 B X |
| 4,265,274 | 5/1981 | Zahid | 138/30 |

FOREIGN PATENT DOCUMENTS

| 225086 | 12/1942 | Switzerland | 220/4 B |
| 948675 | 2/1964 | United Kingdom | 220/85 B |

Primary Examiner—Stephen Marcus
Assistant Examiner—Mark Thronson
Attorney, Agent, or Firm—Pearne, Gordon, Sessions, McCoy, Granger & Tilberry

[57] ABSTRACT

A split tank closure and diaphragm assembly for a hydropneumatic filament wound pressure vessel is disclosed. The assembly includes first and second cup shaped plastic tank liners having oblate ellipsoidal end portions and cylindrical sidewall portions terminating in cylindrical open mouth portions. A ring is provided for joining and sealing the open mouth portions together to form a sealed container and to mount a diaphragm within the tank to divide the interior of the tank into variable volume chambers. The ring has a cylindrical outer surface corresponding to the outside diameter of the cylindrical sidewall portions of the liners. The liners form a dovetail joint with the ring and respectively trap an O-ring and a bulbous portion of the diaphragm between recessed portions of the liner and a surface of the ring to seal the interior of the tank. The assembly is wound with a resin impregnated continuous roving to reinforce the tank and resist internal pressures.

4 Claims, 4 Drawing Figures

SPLIT TANK CLOSURE AND DIAPHRAGM ASSEMBLY

BACKGROUND OF THE INVENTION

This invention relates to filament wound pressure vessels and, more particularly, to a filament wound hydropneumatic accumulator tank containing a flexible diaphragm which separates the interior of the tank into a compressible gas containing chamber and a liquid containing chamber.

Accumulators or pressure control devices according to this invention are especially adapted for liquid dispensing systems and particularly for water systems dependent upon well water, a pump and, because of intermittent use, an intermittent source of pressurization for the system. A simple prior art system for accommodating the pressurization of a well water system, for example, in a dwelling, comprises a pipe extending into the underground water supply, a pump and a reservoir tank. Frequently, the tank is a metal container having no valve and in which air is merely trapped. In some installations, a valve, such as a conventional tire valve, may be positioned at or near the top of the container and an outlet may be provided near the bottom. In many cases, a diaphragm is not provided but it is highly desirable to separate the air from the water in the tank since air will dissolve in the water and may create a "white water" problem at the taps. A charge of air is introduced in the tank, usually occupying about one half of the volume of the tank and to a pressure sufficient to force water into the plumbing system connected thereto. A pressure switch senses the pressure within the tank or in the water line, as the case may be, and operates between limits, for example, between 20 and 40 psi. If the pressure falls below 20 psi the pump is activated and continues to operate until the pressure in the system is built up to 40 psi, causing the pump to be turned off by the pressure switch.

Typical prior art accumulators include a pressure vessel having an expansible bag therein which may be either an inflatable bag which stretches upon the introduction of air or which merely unfolds as the air volume increases or the expansible bag may unfold and also expand. An air valve extends through one end of the tank and an inlet and outlet aperture is provided at the other end of the tank for fluid communication with the water system. As water is pumped into the tank, the bag is forced upwardly by the incoming water. If the bag is the type which merely unfolds, this upward movement is characterized by a sharp annular crease adjacent the inner sidewall of the vessel, which progresses upwardly as the water rises and downwardly as the water is forced from the tank by the pressure in the bag. Thus, there is a substantially constant flexing of major portions of the sidewall of the bag which causes eventual failure, particularly if sand or silt finds its way into the water system due to inadequate or non-existent strainers in the well. Accumulator bags which stretch upon inflation are subject to fatigue and eventual failure particularly if the water is acidic or alkaline since stretching tends to open the pores of the bag material to chemical attack.

Separator bags or diaphragms in pressure tanks are either diaphragm type separators peripherally sealed to the sidewall of the tank usually at an assembly seam wherein the tank is formed by a pair of cup shaped halves or comprises a removable cell which may be removed and replaced upon failure. Both arrangements have advantages and disadvantages. The primary advantage of a diaphragm type separator is that the diaphragm may be constructed from a relatively heavy gauge, plastic or desirably butyl rubber and may be shaped to conform to the cross-section of the tank to eliminate stretching. This arrangement, however, involves the dual problem of providing a pressuretight seal between the mating halves of the pressure vessel and between the sidewall of the vessel and the diaphragm. For the sake of economy attempts have been made to combine the seal between the tank halves and the seal between the diaphragm and the sidewall in a single assembly. This arrangement, however, has not been entirely successful and tank leakage has resulted. Furthermore, these arrangements usually involve protruding flanges and clamps on the exterior of the tank which interfere with attempts to helically wind the tank for added reinforcement.

In order to eliminate the problem of adequate seals, a seamless tank having a removable and replaceable accumulator bag has been developed. Such an arrangement is shown in U.S. Pat. No. 4,214,611. Although the arrangement shown in that patent eliminates the problems involved in joining and sealing tank sections to each other and to a diaphragm, the bag must be fabricated from a relatively thin material so that the bag may be inserted through a relatively small axis opening during assembly. While the arrangement performed its intended function, it was found that the frequency of bag failure required excessive servicing. Moreover, since the bag was assembled in the tank in a blind fashion the interior of the tank could not be adequately inspected for foreign objects or rough interior surfaces which tend to lacerate the bag in use.

SUMMARY OF THE INVENTION

The present invention is an improvement of such prior art devices. A filament wound non-metallic pressure vessel is provided which minimizes the problem of premature bag failure by providing a contour molded heavy gauge butyl rubber diaphragm within a pressure vessel formed by cup shaped tank liners or shelves. An assembly ring provides a pressuretight joint between the diaphragm and the sidewall of the one of the liners and provides a seal with respect to the other liner. The assembly comprising the cup shaped liners and the assembly ring provides a smooth exterior surface which may be filament wound employing conventional winding techniques. The assembly ring enables the tank to be assembled in a simplified manner and in such a way that the seals may be inspected during assembly to assure the assembler that a properly sealed tank will result. Furthermore, the assembler is able to inspect the interior of the tank for foreign objects during the assembly operation.

DETAILED DESCRIPTION OF THE INVENTION

Figure 1:
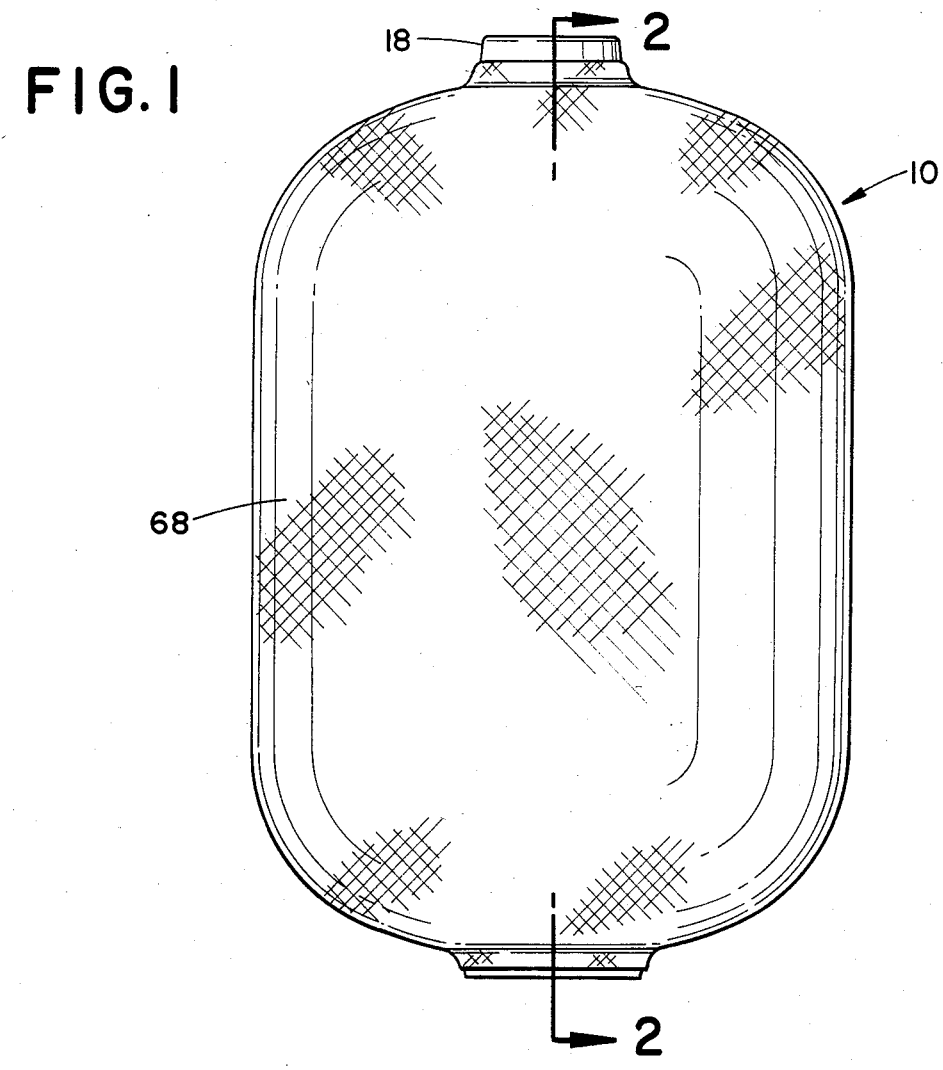
FIG. 1 is an elevational view of a hydropneumatic filament wound pressure vessel according to this invention.

Referring now to the drawings, there is illustrated an accumulator vessel or tank 10 which is formed by cup shaped thermoplastic tank shells or liners 12 and 14. The liners 12 and 14 are preferably injection molded but may be formed by other molding techniques. Moreover the liners 12 and 14 may be formed by techniques involving the use of fibrous reinforcing forms and thermosetting resin systems.

The liner 12 is provided with a circular recess 16 which receives a cup shaped plastic valve guard 18 which may be cemented within the recess 16. A conventional one way check valve such as a conventional tire valve 20 is provided within the guard 18 and extends through the guard 18 and the liner 12 for fluid communication with a pressure chamber 22 within the tank 10.

The cup shaped liner 14 is provided with an opening 24 and a surrounding annular recessed shoulder 26. A tank bottom fitting 28 which is provided with a threaded axis opening 30 has an annular flange 32 which is seated on the annular shoulder 26. The fitting may be sealed within the opening by suitable electromagnetic heating techniques or a suitable adhesive or both, or the fitting may be molded as an integral part of the liner.

Figure 3:
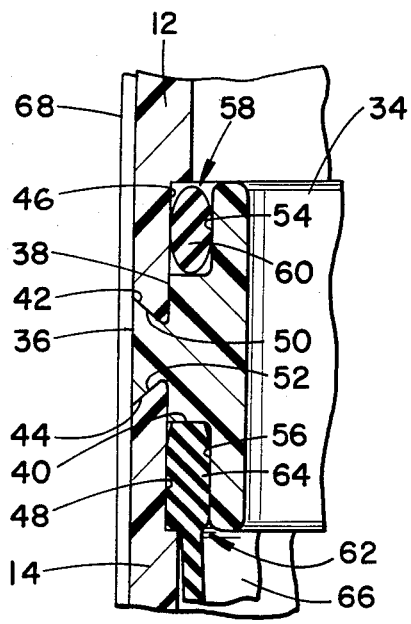
FIG. 3 is an enlarged fragmentary cross-sectional view showing details of the seal.

The liners 12 and 14 are retained in mouth to mouth apposition to form a sealed container by a mounting ring 34. As may be seen most clearly in FIG. 3, the mounting ring 34 is defined by a cylindrical outer surface 36 corresponding to the outside diameter of the cylindrical sidewall portions of the liners 12 and 14. The ring 34 is further defined by a pair of spaced intermediate cylindrical surfaces 38 and 40 having an outside diameter corresponding to the diameter of circumferential recesses 46 and 48 provided in the liners 12 and 14. The surface 36 is joined to the spaced intermediate cylindrical surfaces 38 and 40 by a pair of conical surfaces 42 and 44 which taper radially inwardly toward each other to form a pair of circumferential pockets or recesses at the ends of each intermediate cylindrical surface 38 and 40.

The pockets thus defined by the surfaces 38, 40, 42 and 44 receive the open mouth portions of the liners 12 and 14. Each circumferential recess 46 and 48 has a beveled or conical end 50 and 52 which respectively meets with the surfaces 42 and 44.

Figure 4:
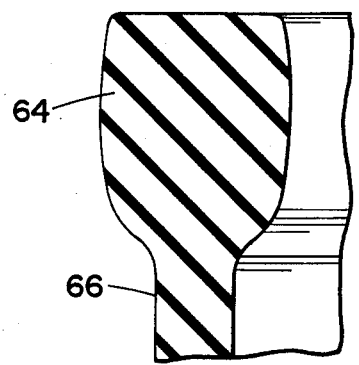
FIG. 4 is a fragmentary enlarged cross-sectional view of the upper lip of the diaphragm showing the lip in an uncompressed condition.
Figure 2:
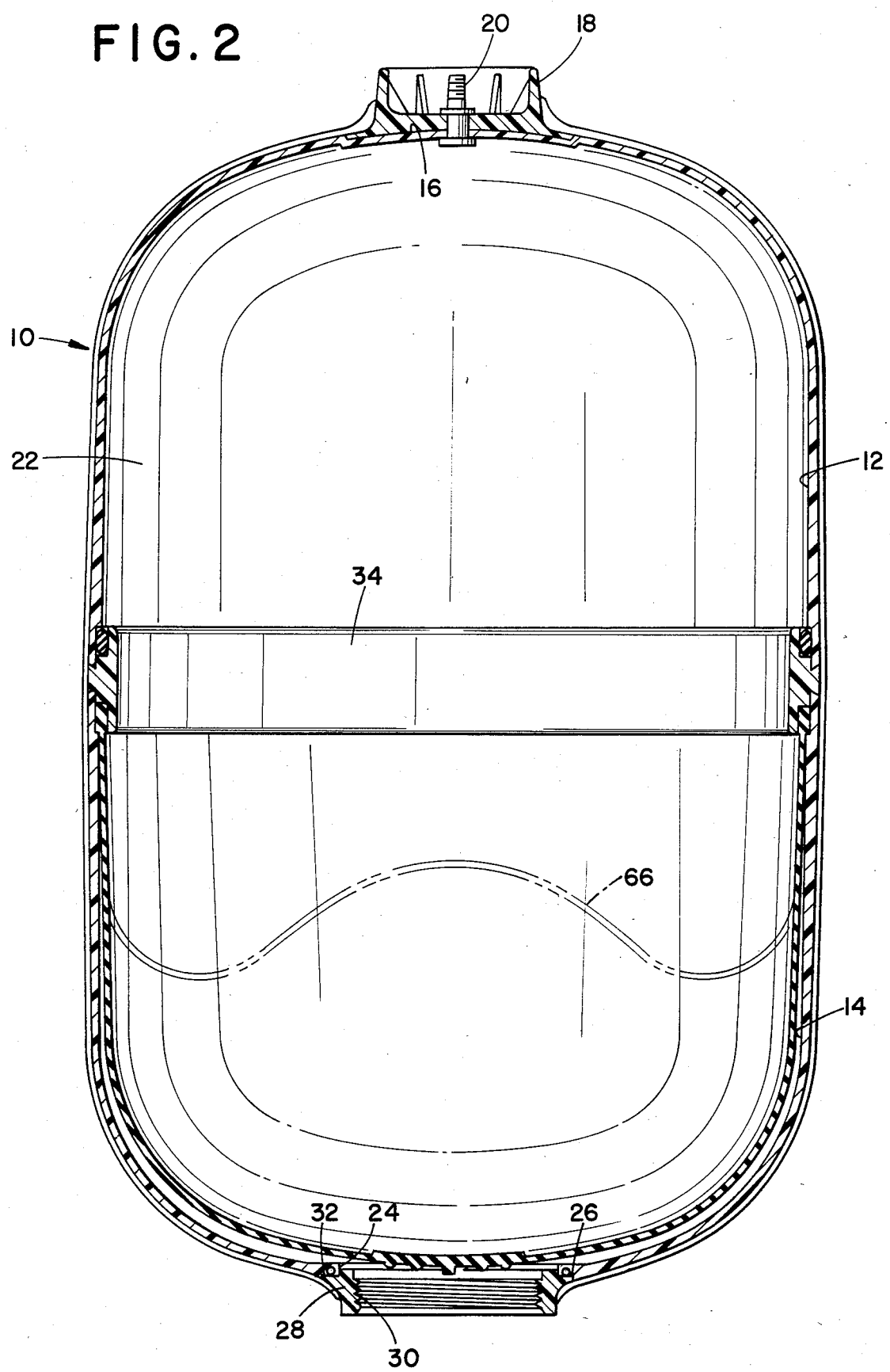
FIG. 2 is a cross-sectional view, the plane of the section being indicated by the line 2—2 in FIG. 1.

The ring 34 is further defined by circumferential recesses 54 and 56. The recess 54 cooperates with the recess 46 to form a circumferential groove 58 which is provided with an O-ring 60. The O-ring 60 is trapped by the recess 46 to form a dynamic seal for air pressure in the tank. The recesses 56 and 48 form a pocket 62 which traps a bulbous portion 64 of a separating bladder or diaphragm 66. As may be seen in FIG. 4, the bulbous portion 64 in its uncompressed state approximates the cross section of an O-ring to effectively seal the pressurized air and water within the tank 10.

By employing conventional filament winding techniques, the entire outer surface of the tank is filament wound in helical pattern by resin impregnated rovings such as resin impregnated continuous glass fibers 68. If desired, a level winding of filaments may be applied to the cylindrical sidewall portion of the tank 10.

The tank joining and sealing assembly of the present invention enables the pressure vessel to be quickly and easily assembled prior to the winding operation. The bulbous portion 64 in its unstressed or uncompressed condition has an inside diameter which is slightly less than the diameter of the surface 56 so that the diaphragm 66 may be retained on the ring 34 while the ring 34 is nested on the liner 14. Friction between the bulbous portion 64 and the annular groove 48 tends to maintain the diaphragm 66 in place during this operation. After the ring 34 has been assembled on the liner 14, the O-ring 60 is mounted to encircle the surface 54 and the liner 12 is then positioned on the ring. The surfaces 42 and 44 tend to guide the liners 12 and 14 into place during the assembly operation and the cooperation between the surfaces 42, 50 and 44, 52 resists radial separation of the liners and ring during pressurization of the tank. Any longitudinal movement of the liners relative to each other does not break the pressure seal because of the dynamic seals formed by the O-ring and the bulbous lip of the diaphragm.

After the liners are so assembled, they may be taped together to prevent accidental disassembly during handling and during the step of mounting the assembly in a filament winding machine for the winding operation.

Although the preferred embodiment of this invention has been shown and described, it should be understood that various modifications and rearrangements of the parts may be resorted to without departing from the scope of the invention as disclosed and claimed herein.

What is claimed is:

1. A hydropneumatic filament wound pressure vessel having a split tank closure and diaphragm assembly comprising first and second cup shaped plastic tank liners, said liners having oblate ellipsoidal end portions and cylindrical sidewall portions terminating in circular open mouth portions, said sidewall portions having recessed end portions, ring means for joining and sealing the open mouth portions together to form a sealed container, said ring means being defined by a cylindrical outer surface having an outside diameter corresponding to the outside diameter of the cylindrical sidewall portions of the liners, being defined by a pair of spaced intermediate cylindrical surfaces having end portions and an outside diameter corresponding to an inside diameter of the recessed end portions of the cylindrical sidewall portions of the liners, being defined by circumferential recesses at the end portions of the intermediate circumferential surfaces, and being defined by a pair of conical surfaces joining the cylindrical outer surface and the spaced intermediate surfaces and tapering radially inwardly toward each other from the outer surface to the intermediate surfaces, the open mouth portions being telescopically received on the intermediate circumferential surfaces and having end edges tapered to conform to said conical surfaces, an interface between the inner surface of a liner and one of said intermediate surfaces and an interface between the inner surface of a liner and the other one of said intermediate surfaces, the inner surfaces of said recessed end portions of said liners and said circumferential recesses forming a pair of circumferential grooves, an O-ring seal in one of said grooves sealing the interface between the inner surface of a liner and one of said intermediate surfaces, a flexible diaphragm separating the interior of said liners into discrete variable volume pressure chambers, the periphery of said diaphragm having a bulbous portion and being received in the other of said grooves sealing the interface between the inner surface of a liner and the other one of said intermediate surfaces, and a resin impregnated filament winding covering the liners and the outer cylindrical surface of said ring means in a predetermined winding pattern.

2. A vessel according to claim 1, wherein said O-ring seal and said bulbous portion are compressed between and by the intermediate surfaces and the inner surfaces of the liners with any tendency of the mouths of said liners to move radially outwardly being resisted by the conical surface portions of said ring means.

3. A vessel according to claim 1, wherein one of said pressure chambers is provided with a fitting adapted to connect said one pressure chamber to a water source and to a water distribution system and another one of said chambers is provided with a one way check valve adapted to be connected to a source of pressurized air.

4. A vessel according to claim 1, wherein said winding pattern is a helical pattern.

* * * * *